(12) United States Patent
Yamaguchi

(10) Patent No.: US 7,548,002 B2
(45) Date of Patent: Jun. 16, 2009

(54) AXIAL AIR-GAP ROTOR AND AXIAL AIR-GAP CORELESS MOTOR EQUIPPED WITH THE SAME

(75) Inventor: Tadao Yamaguchi, Isesaki (JP)

(73) Assignee: Tokyo Parts Industrial Co., Ltd., Gunma-Ken (JP)

( * ) Notice: Subject to any disclaimer, the term of this patent is extended or adjusted under 35 U.S.C. 154(b) by 297 days.

(21) Appl. No.: 11/702,870

(22) Filed: Feb. 6, 2007

(65) Prior Publication Data

US 2008/0054742 A1 Mar. 6, 2008

(30) Foreign Application Priority Data

Sep. 1, 2006 (JP) ............................... 2006-237714
Sep. 26, 2006 (JP) ............................... 2006-260116

(51) Int. Cl.
*H02K 11/00* (2006.01)
(52) U.S. Cl. ............................ 310/71; 310/81; 310/233
(58) Field of Classification Search .................. 310/71, 310/81, 231–234
See application file for complete search history.

(56) References Cited

U.S. PATENT DOCUMENTS

| | | | | |
|---|---|---|---|---|
| 6,291,915 B1* | 9/2001 | Yamaguchi | .................. | 310/71 |
| 6,384,499 B2* | 5/2002 | Yamaguchi | .................. | 310/81 |
| 6,541,891 B2* | 4/2003 | Yamaguchi | .................. | 310/268 |
| 7,247,963 B2* | 7/2007 | Sohara | ........................ | 310/81 |
| 2001/0013730 A1* | 8/2001 | Yamaguchi | .................. | 310/81 |
| 2005/0099074 A1* | 5/2005 | Yamaguchi et al. | ........... | 310/81 |
| 2005/0140222 A1* | 6/2005 | Sohara | ........................ | 310/81 |

FOREIGN PATENT DOCUMENTS

| | | |
|---|---|---|
| JP | 7-85636 | 9/1995 |
| JP | 3398546 | 1/1998 |
| JP | 2872623 | 1/1999 |
| JP | 3261329 | 12/2001 |

* cited by examiner

*Primary Examiner*—Thanh Lam
(74) *Attorney, Agent, or Firm*—Jordan and Hamburg LLP

(57) ABSTRACT

An axial air-gap rotor includes wound air-core armature coils disposed on one side of a printed wiring board, and a cylindrical commutator disposed at the rotation center. The commutator includes commutator pieces separated from each other by positioning guides provided on the base, and each having a connection terminal integral with and extending axially from an arc-shaped sliding contact portion and flat portion, the printed wiring board further having terminal connection lands for the wound air-core armature coils, and through holes connected to the terminal connection lands in which the distal ends of the connection terminals are fitted and connected on the other side.

9 Claims, 14 Drawing Sheets

AXIAL AIR-GAP ROTOR AND AXIAL AIR-GAP CORELESS MOTOR EQUIPPED WITH THE SAME

BACKGROUND OF THE INVENTION

The present invention relates to an axial air-gap rotor suitable for use as a silent call mechanism for a portable communication device and the like, and improvement of an axial air-gap motor having such a rotor. More specifically, the present invention relates to a motor providing both high speed rotation and a relatively long life.

A type of silent call mechanism for a portable communication device is a vibration motor that uses centrifugal vibrations. One such vibration motor has, on an output shaft of a regular rotation type cylindrical motor, an eccentric weight having a ginkgo leave-like cross-section. Further, the applicant has proposed an axial air-gap flat motor wherein a rotor incorporated therein generates centrifugal vibrations. A vibration motor with a rotor incorporated therein requires no output shaft and, therefore, in recent years, because of its rotation method, such motors have been used commercially as shaft-fixed types that require one fewer bearing. Such shaft-fixed type motor usually makes use of a thickness of a magnet to provide a burring hole in a bracket. A shaft base end is press inserted therein, and the other end of the shaft is received by a case, as described, for example, in Japanese Patent No. 3261329.

Further, the applicant has proposed a motor configured such that a burring hole is provided in a case. A shaft base end is press inserted therein, and the other end of the shaft is freely provided without any support, as disclosed in Japanese Patent No. 2872623.

Most of such axial air-gap motors employ an axial sliding contact type rectifier for purposes of minimization.

In such an axial sliding motor, generally a commutator comprising a plurality of segments printed on a printed wiring board and plated with a noble metal to a thickness of some μm, used in combination with an axial sliding contact brush in a plate-like shape with a thickness of 0.04 mm to 0.06 mm. When an axial sliding motor is used for a vibration motor serving as a silent call mechanism for a portable communication device, such a motor used only for alarm is operated only some 10-odd times a day (a minute or two in total), and for that reason a relatively short life is sufficient. However, when such a motor is used for games and other functions requiring vibrations, a much longer life is required.

For this reason attention has focused on the used of a cylindrical commutator, which allows thick segment pieces to be used.

While in accordance with prior art in which a cylindrical commutator is used for an axial air-gap motor, such a motor is problematic in minimization because a commutator is attached at a later time, as described, for example, in Published Japanese Patent No. H07-85636 (Japanese Patent No. 2134716).

Generally, for an axial air-gap motor, or more specifically a flat rotor, attaching a cylindrical commutator at a later time is not desirable, because rotor thickness increases, and at minimum, a thickness of 3.5 mm is required for the motor as a whole. Thus, by constructing a cylindrical commutator from a rotor itself will enable the motor thickness to be 3 mm or less.

Further, such a flat rotor generally employs a constitution in accordance with which a plurality of wound air-core armature coils are placed on one side of a printed wiring board, and a commutator is provided on the side opposite the air-core armature coils, i.e., facing the axial air-gap magnet.

However, even with a thin printed wiring board, because of copper foil, resist and the like, its thickness is about 0.2 mm. Therefore, despite the fact that the gap between such board and the axial air-gap magnet with which it is to be used is usually 0.2 mm, because the printed wiring board requires the space for its thickness, the effective air-gap until the coils increases to 0.4 mm, so that the effective air-gap magnetic flux density of the wound air-core armature coils decreases, and efficiency degrades.

It is an object of the present invention to dispose a printed wiring board in a manner such that the effective air-gap magnetic flux density contributing to coils is not lowered, and to form a commutator base using resin constituting a part of a rotor, thereby achieving a low profile by directly attaching commutator pieces to the rotor, and achieving long life by increasing a thickness of rectifier sliding contact portions.

SUMMARY OF THE INVENTION

The above problems can be resolved by a rotor comprising a printed wiring board, a plurality of wound air-core armature coils disposed on one side of the printed wiring board, and a commutator disposed at the rotation center of one side of the printed wiring board. The commutator comprises a base and a plurality of commutator pieces, including a sliding contact portion, separated from each other by positioning guides provided on the base. A contact terminal extending axially from and integrally with the sliding contact portions, terminal connection lands for the wound air-core armature coils formed on the printed wiring board and a plurality of through holes formed on the printed wiring board connected to some of the terminal connection lands, are provided. The commutator pieces are mounted on the base, and the distal ends of the connection terminals are embedded in the through holes and connected.

With such a configuration, because the commutator pieces can be easily separated from each other using the positioning guide and directly assembled to the rotor with precision, a low profile motor can be obtained. And because the printed wiring board is opposite the axial air-gap magnet with which it is to be combined, lowering of the magnetic flux density in the coils is possible, and high efficiency is attained.

In a preferable specific configuration, the printed wiring board has notches for leading out terminals for the wound air-core armature coils, and the wound air-core armature coil terminals are led through the notches for leading out terminals.

With such a configuration, even with wound air-core armature coils made up of thin wires, the notches for leading out terminals can be used for leading the wound air-core armature coil terminals, so there is not a danger, as in the conventional art, of the terminals being sandwiched between coils and printed wiring board and thus being crushed and disconnected.

In another specific constitution, the commutator has a cylindrical shape, the sliding portions of the commutator pieces are formed in an arc shape. A flat portion set at least in part no thicker than the wound armature coils is provided between the sliding contact portions and the connection terminals, and the positioning guide uses at least the flat portion.

With such a configuration, even with a cylindrical commutator, because only the sliding contact portions substantially protrude in an axial direction, a low profile is possible. Furthermore, because the brush has a small sliding contact radius, sliding brake loss is reduced, thereby achieving high efficiency.

In accordance with yet another preferable embodiment comprising such a cylindrical commutator, a thin magnetic body is formed on the other side of the printed wiring board.

With such a configuration, even a rectifier comprising a cylindrical commutator and radial sliding contact brush can be stably applied in the axial direction using the magnetic force of an axial air-gap magnet used in combination with this rotor. Such a thin magnetic body may have, adhered thereto, a silicon steel plate with a thickness of about, for example, 0.05 mm or, alternatively, a magnetic plating may be formed on a printed pattern.

In another mode, such a commutator rotor is of a flat type, the sliding portions of the commutator pieces have a planar shape, and at least the sliding contact portions are used as positioning guides.

With such a configuration, because the commutator is not of a printed wiring board type, the sliding contact portions can be made relatively thick, enabling a rectifier to have a long life. And because the commutator is flat, a thinner motor can be obtained.

To attain such a rotor with an eccentric rotor, the wound air-core armature coils and eccentric weight are integrated with the base using a resin. More preferably, the eccentric weight comprises a main component and retaining parts that interlock with the resin.

With such a configuration, the eccentric weight has sufficient weight. In addition, impact resistance is ensured by means of the retaining parts. Further, with the use of resin having a thermal deformation temperature at 250° C. or higher, the commutator connection terminals can be connected to the printed wiring board by reflow.

To constitute a motor using such an axial air-gap rotor, the axial air-gap rotor has a shaft support portion at the center, the axial air-gap rotor is rotatably supported in the housing via the shaft, and there are provided, a brush in sliding contact with the commutator pieces, a magnet provided outward of the brush, and the housing for accommodating the same.

With such a configuration, because the commutator is not of a printed wiring board type, the sliding contact portions are thicker, thereby obtaining a long life axial air-gap coreless motor.

In a specific constitution, the commutator pieces have a thickness of at least 0.15 mm, at least the sliding surface thereof is formed of noble metal, and the brush comprises a spring material with a thickness of 0.03 mm to 0.08 mm and a sliding contact member with a thickness of at least 0.1 mm disposed on the spring material.

DETAILED DESCRIPTION OF THE PREFERRED EMBODIMENT

First Embodiment

An explanation will be given for an axial air-gap rotor of the present invention comprising an eccentric rotor for generating vibrations.

In FIGS. 1 through 4, at the center on one side of a printed wiring board 1, a resin 2 advantageously having a thermal deformation temperature of 250° C. or higher is used to integrally mold in an upright manner a commutator base 2a, and three wound air-core armature coils 3A, 3B and 3C are disposed around the radial periphery of the base 2a at a disposition opening angle of about 60° and integrally molded with an eccentric weight (described below) using the resin 2.

Figure 4:
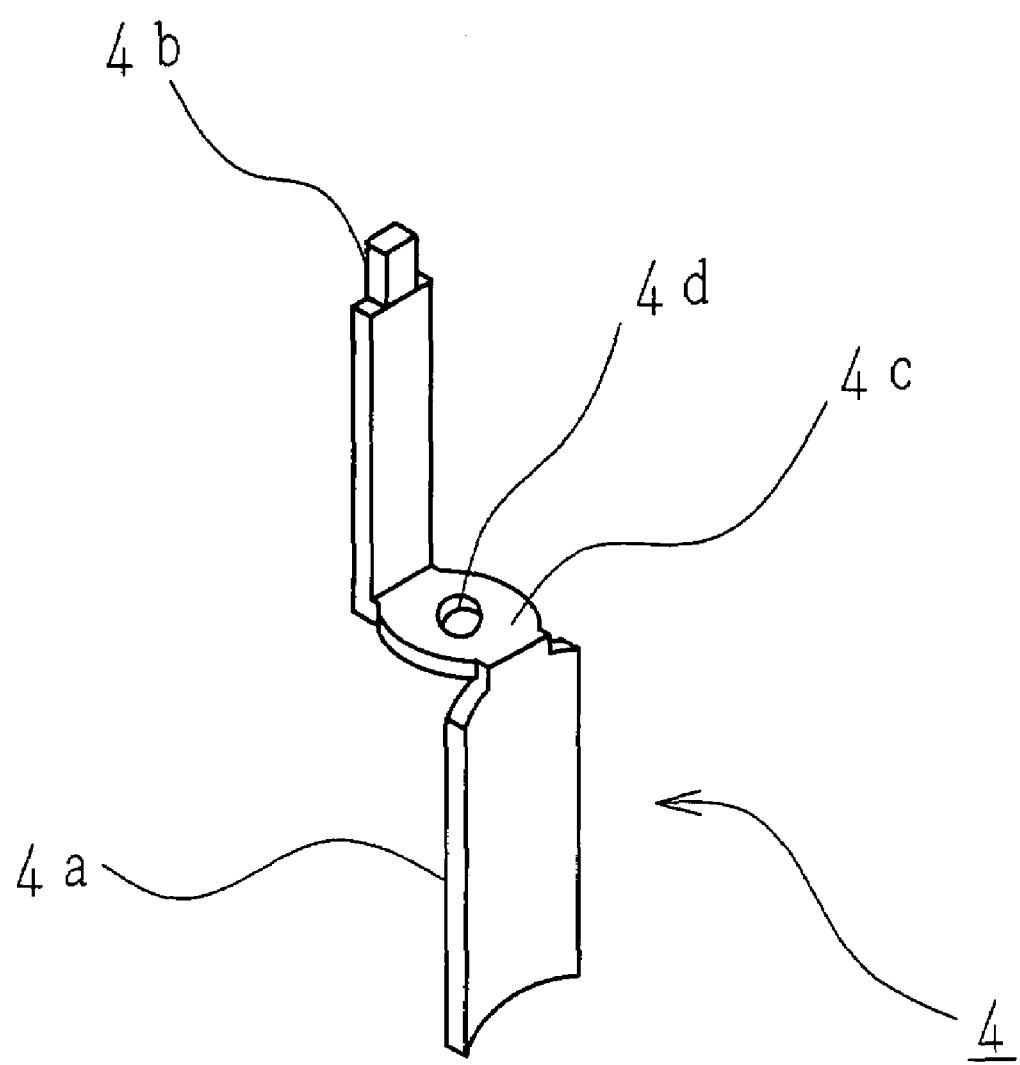
FIG. 4 is a perspective view of a commutator piece.

A cylindrical commutator C comprises the commutator base 2a, six commutator pieces 4 comprising, as shown in FIG. 4, an arc-shaped sliding contact portion 4a on the outer periphery of the base 2a, a flat portion 4c extended in a horizontally outward direction, and a connection terminal 4b bent in the axial direction from the flat portion 4c.

Advantageously, the commutator piece 4 has a thickness of 0.15 mm to 0.3 mm, and at least the surface of the sliding contact portion 4a is formed of noble metal.

The base 2a has a recess having the same shape as the flat portion 4c of the commutator piece 4, and a protrusion 2c that fits into the hole 4d provided in the flat portion 4c, thus serving as a positioning guide for assembling the commutator pieces 4 to the commutator base 2a.

Further, because the flat portion 4c is embedded in the thickness direction below the surface of the wound air-core armature coils 3A, 3B and 3C, only the arc-shaped sliding contact portion 4a protrudes therefrom, achieving minimization even when a cylindrical commutator is used.

The base 2a further has holes 2d into which the connection terminals 4d are fitted, and the printed wiring board 1, at an end thereof, has through holes 1a into which the leading ends of the connection terminals 4b are fitted.

The connection terminals 4b extend axially upwardly above the thickness of the wound air-core armature coils 3A, 3B and 3C, and the leading ends thereof are respectively fitted into the through holes 1a formed in the printed wiring board 1, and soldered and connected at the other side.

The through holes 1a are connected to three terminal connection lands 1e formed on the outer periphery of the printed wiring board 1 so as to connect the winding start terminals of the wound air-core armature coils 3A, 3B and 3C. In the drawings, 1f denotes a star connection land for gathering and connecting the winding end terminals of the wound air-core armature coils 3A, 3B and 3C.

Figure 2:
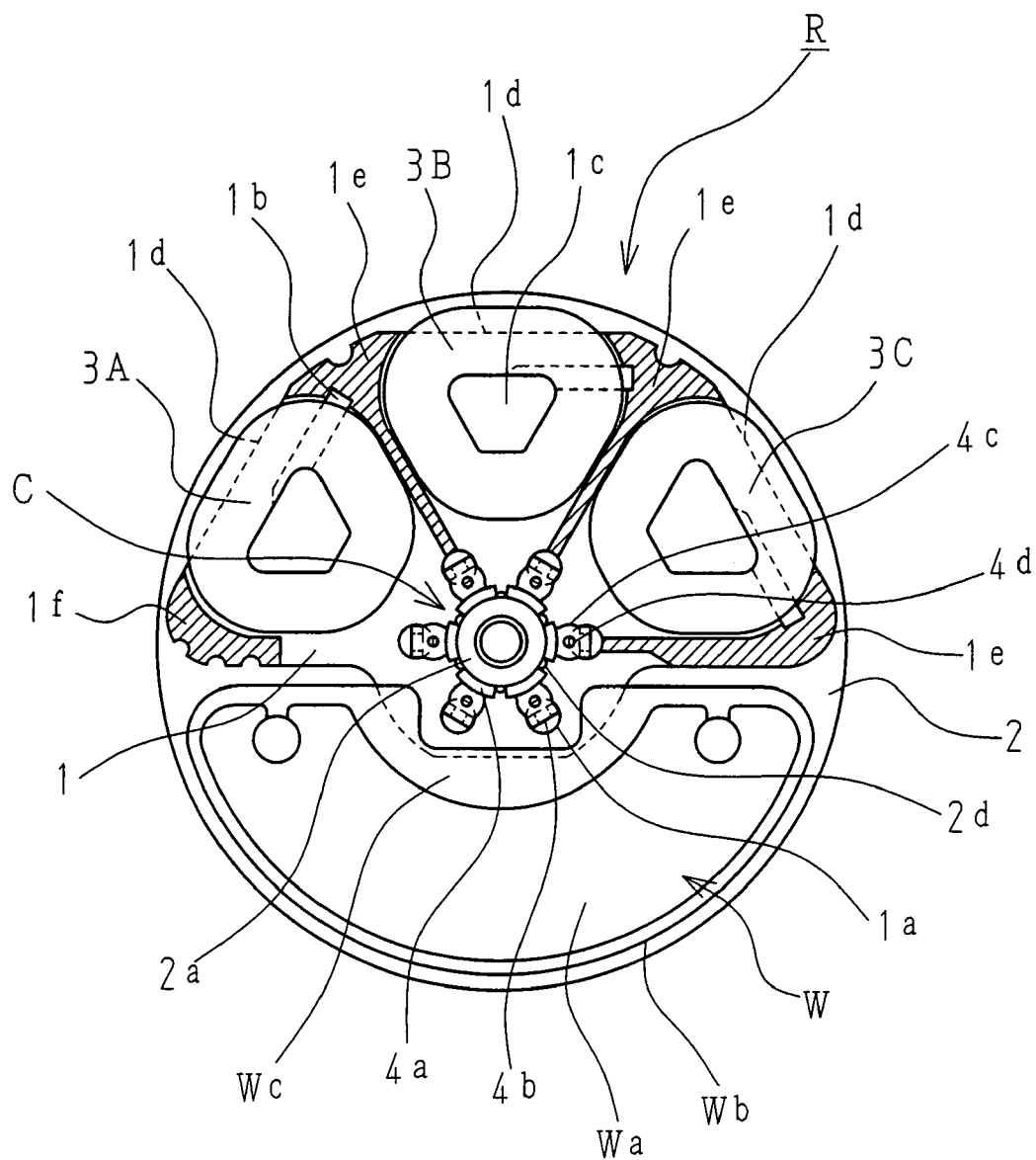
FIG. 2 is a plan view of the rotor in FIG. 1 viewed from the bottom.
Figure 5:
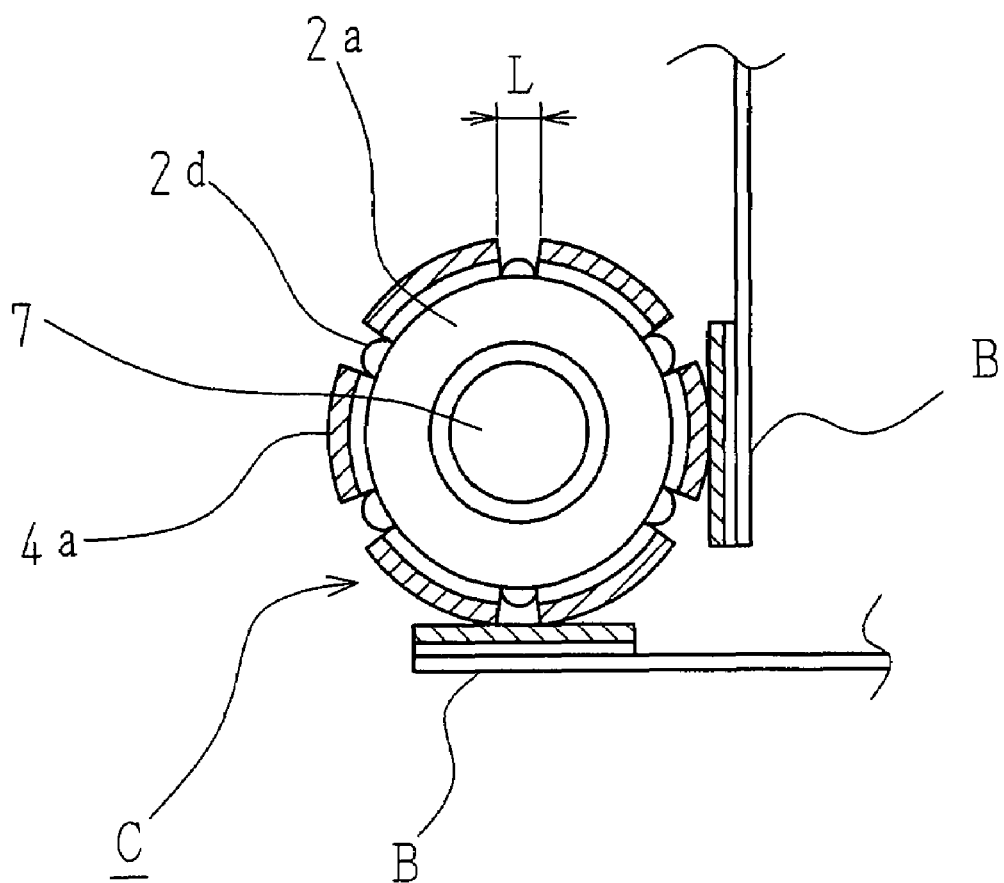
FIG. 5 is a cross-sectional view of a main component including brushes in sliding contact with a commutator.

Integrally protruding from the outer periphery of the commutator base 2a are, as shown in FIGS. 2 and 5, separate positioning guides 2d comprising protrusions in a number matching the number of the commutator pieces (six in this case) to be assembled. The height of these guides 2d is no more than half the thickness of the sliding contact portion 4a of the commutator pieces 4 to be assembled, and a width L is set as a separation slit (here, about 0.15 mm).

The printed wiring board 1 is configured such that there are further provided inner diameter guide holes 1c for the wound air-core armature coils 3A, 3B and 3C, and long holes 1b continuing therefrom so as to transverse the coil winding thickness, parts of the outer diameter are formed into notches for leading out terminals 1d so as to be smaller than the coil disposition outer diameter, and the coil ending terminals are connected through the notches for leading out terminals 1d to the terminal connection lands 1e (details not shown in the drawings).

Therefore, these terminals are treated without being sandwiched between the printed wiring board 1 and air-core armature coils, thereby preventing disconnection.

On the opposite side across from the center of the three wound air-core armature coils 3A, 3B, and 3C, a tungsten alloy eccentric weight W having a specific gravity of about 18 is integrated using the resin 2, thus forming an eccentric rotor.

Figure 3:
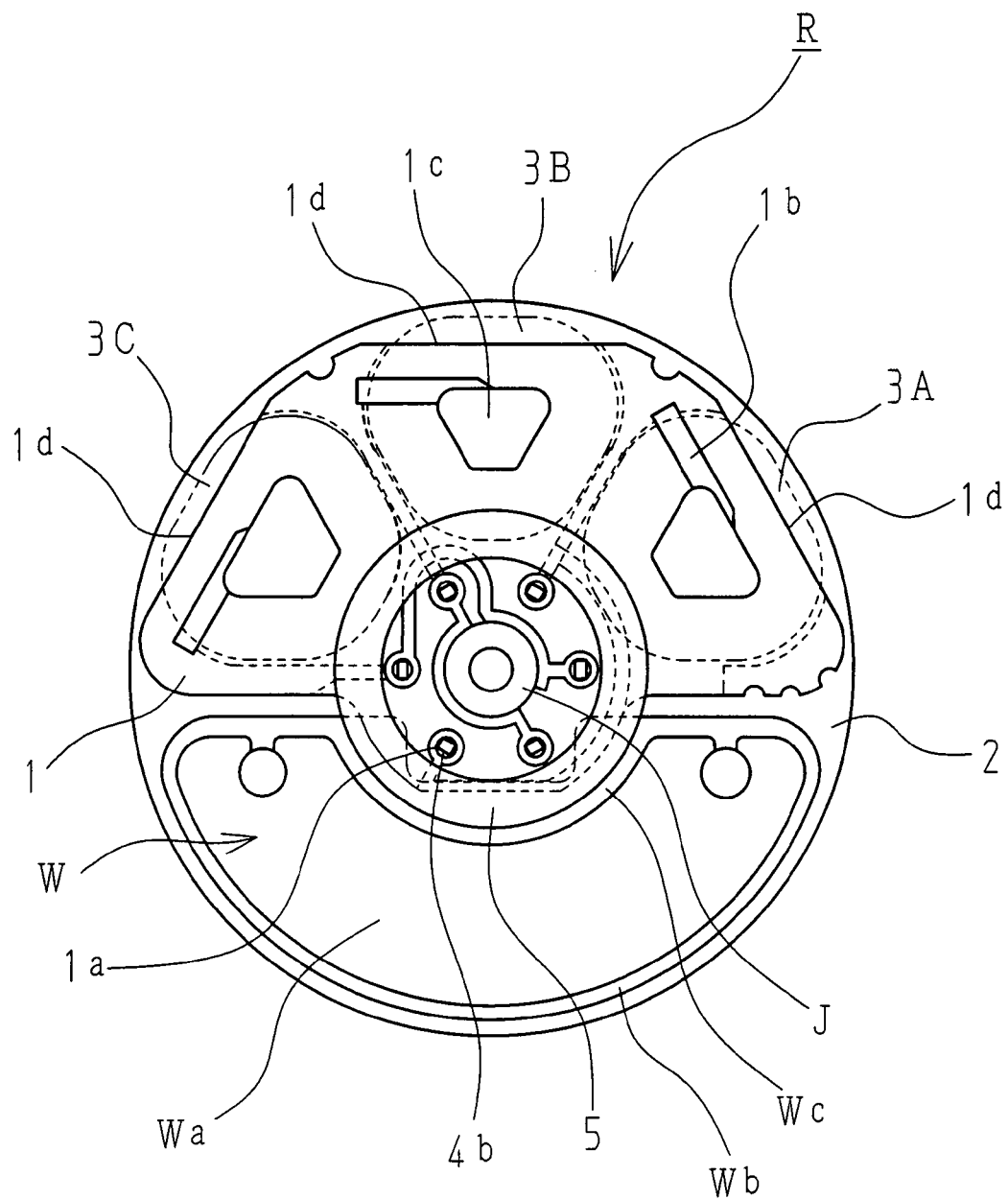
FIG. 3 is a top view of the rotor in FIG. 1.

The eccentric weight W must make full use of the rotor thickness to ensure sufficient weight. For this reason, the eccentric weight W is configured so that a main component Wa is exposed at the portion where there is no printed wiring board 1. An axial retaining part Wb, also serving as weight enhancement and having its outer periphery embedded in the resin, and a radial retaining part Wc are formed. More specifically, both surfaces of the main component Wa are formed so as to be exposed from the resin 2, and the retaining parts Wb and Wc are covered with the resin 2, ensuring retaining strength. In FIGS. 2 and 3, resin 2, other than the commutator base 2a, is omitted.

With such a configuration, a large eccentricity can be obtained due to the difference in specific gravity and specific volume between the wound air-core armature coils 3A, 3B and 3C and the eccentric weight W.

Figure 1:
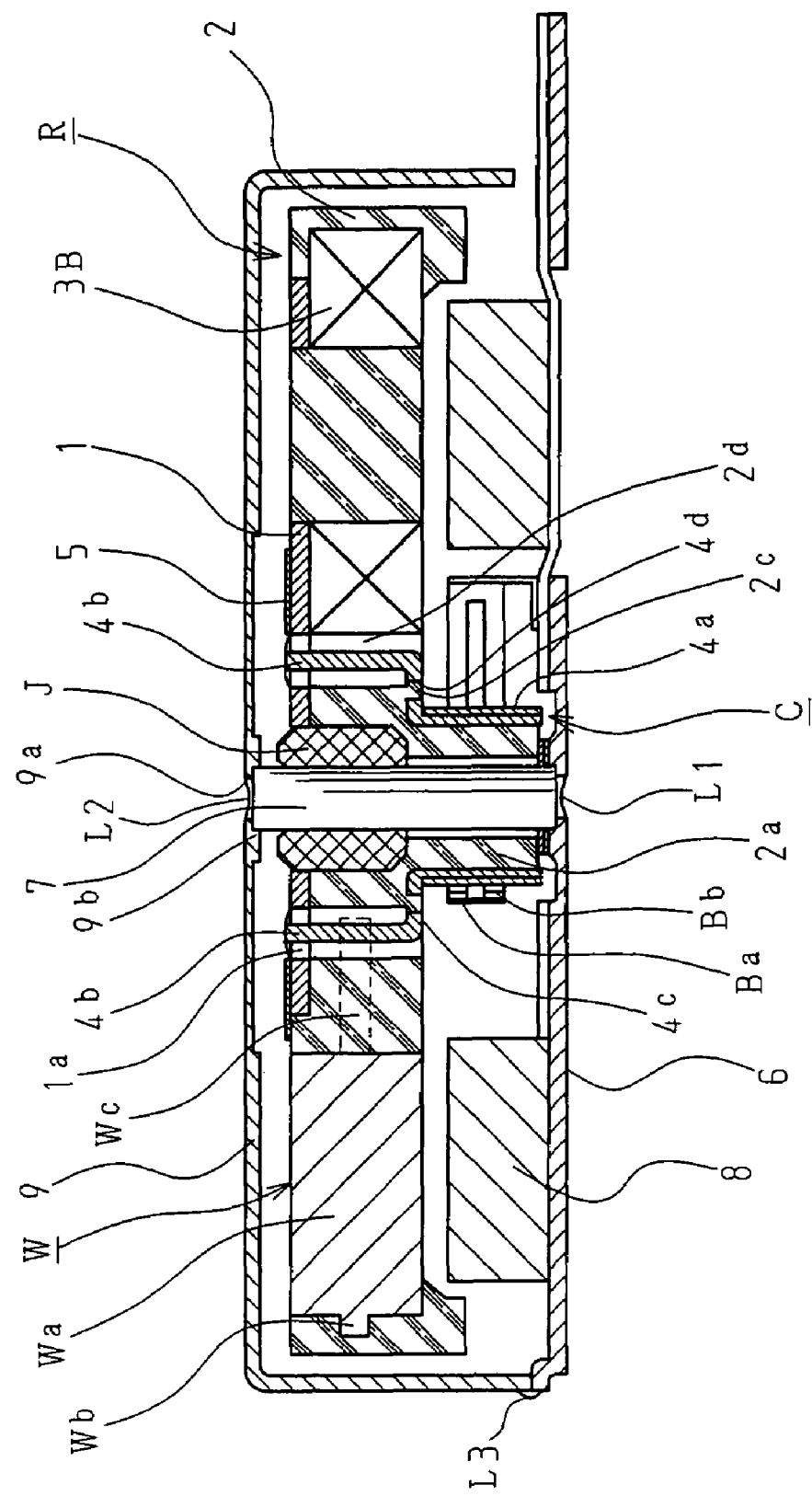
FIG. 1 is a cross-sectional view of an axial air-gap coreless motor using a cylindrical commutator as an axial air-gap rotor of the present invention.

The eccentric rotor R further has, at its center, an oil-impregnated bearing J integrally embedded therein and a suction board 5 for impelling in the axial direction further integrated therewith, and is rotatably attached via the oil-impregnated bearing J to a shaft 7 having its base end fixed to a bracket 6 by laser welding L1. As shown in FIG. 1, eccentric rotor R is accommodated in a case 9 serving as a housing so that a brush B, in sliding contact with the cylindrical commutator C at an opening angle of 90° from a radial direction, is made to face a magnet 8 disposed on the bracket 6 outside of the brush B across an air-gap, as best seen in FIG. 5.

The shaft 7 is assembled such that the distal end thereof is embedded in a recess 9b having a small diameter through hole 9a at the center of the case 9 and laser welded L2 from the outside as necessary, and the case 9 is again laser welded L3 to the bracket outer periphery at the opening.

Figure 6:
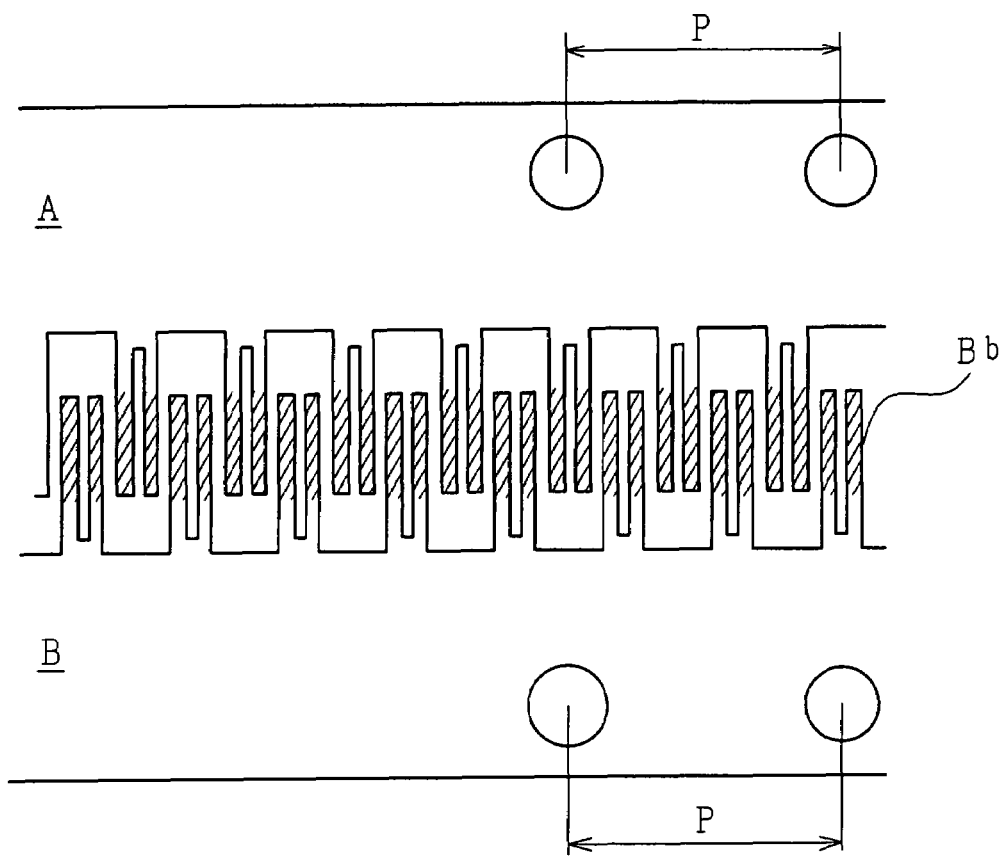
FIG. 6 is a diagram for explaining a manufacturing method of a brush sliding piece.
Figure 7:
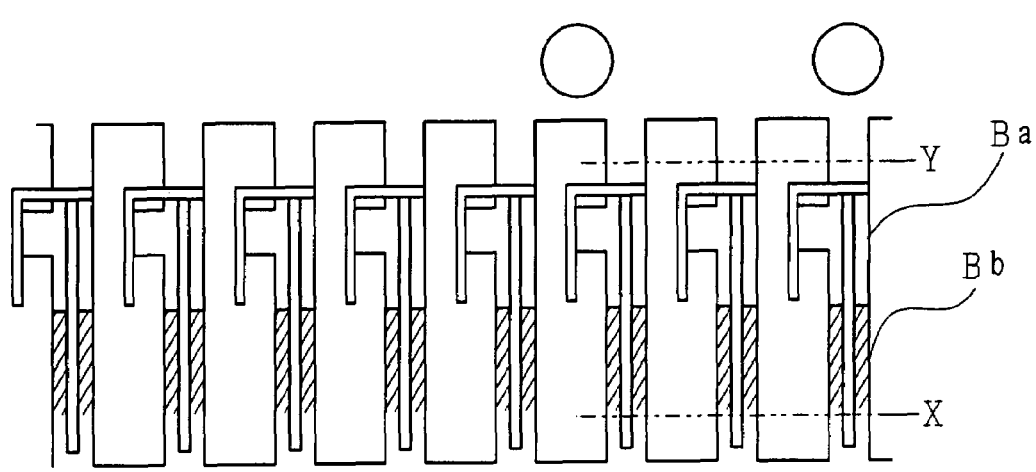
FIG. 7 is a diagram for explaining a manufacturing method for attaching the sliding piece in FIG. 6 to a brush spring.

As shown in FIGS. 6 and 7, the brush B comprises a brush spring Ba formed by joining and pressing springy white-metal two-pronged forks having a thickness of about 0.03 mm to 0.1 mm, more preferably of about 0.05 mm, and sliding pieces Bb comprising hoop material with a thickness of 0.1 mm to 0.3 mm, more preferably of about 0.15 mm, and with a sliding surface cladded with a noble metal to a thickness of about 0.08 mm. The brush spring and the sliding pieces are matched at the same pitch P and spot welded, and the connecting sections are removed.

As shown in FIG. 6, such brush sliding pieces are formed as follows. To avoid noble metal clad portion loss, row A and row B are brought together and are pressed in a state where a large number of such pieces are coupled at the same pitch P. As shown in FIG. 7, on top of the sliding piece Bb row B, a brush spring Ba comprising two-pronged forks with both sides coupled at the same pitch is overlapped and spot welded thereto, the brush springs Ba and sliding pieces Bb are integrally cut off along the line X, and the brush springs Ba are cut off along the line Y.

Second Embodiment

Figure 8:
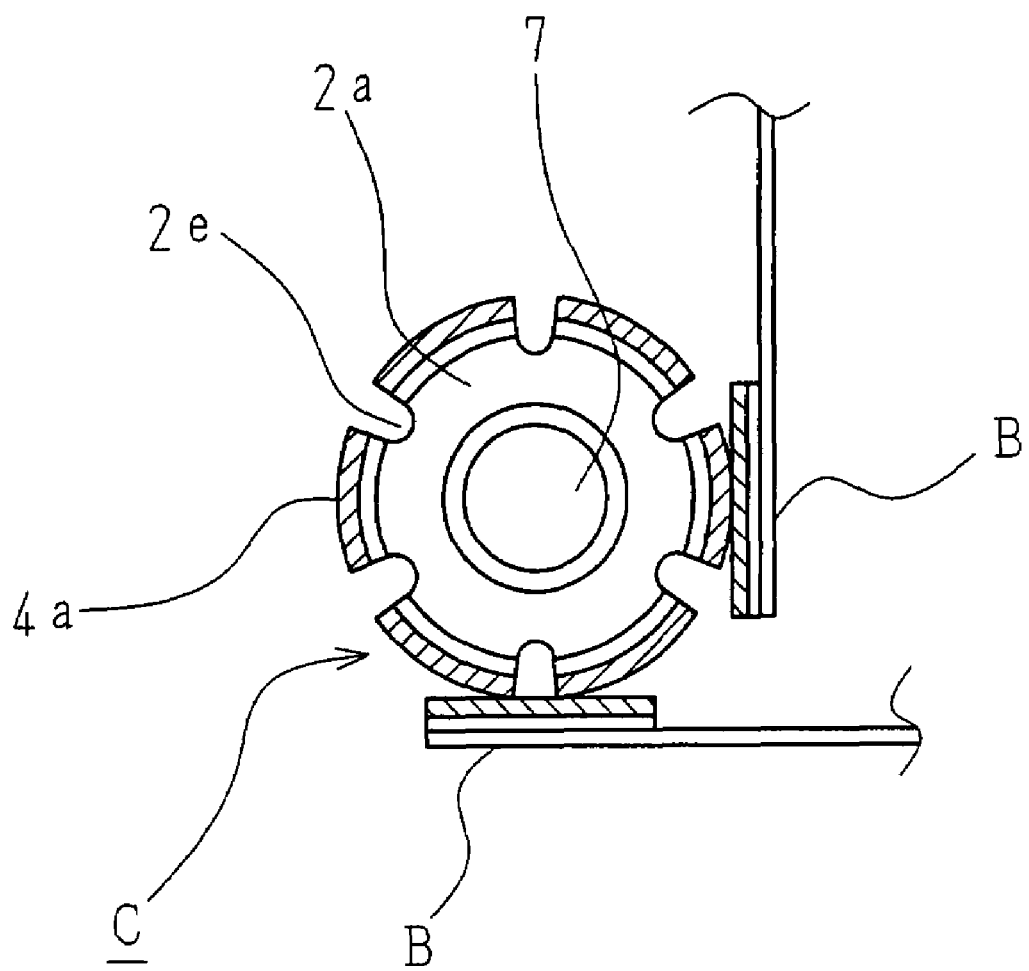
FIG. 8 is a cross-sectional view of a primary components including a brush in sliding contact with a commutator, illustrating a modification of a positioning guide.

FIG. 8 shows a modification of the positioning guide, wherein, instead of the positioning guides 2d being formed of protrusions, positioning guides 2e comprise recesses on the outer periphery of the commutator base 2a.

Such positioning guides 2e comprising recesses can be assembled such that protruding jigs fitting therein are applied and the commutator pieces 4 are assembled with a set distance therebetween.

Third Embodiment

Next, an explanation will be given for another embodiment of an axial air-gap rotor of the present invention using an eccentric rotor for generating vibrations comprising a flat commutator.

Figure 9:
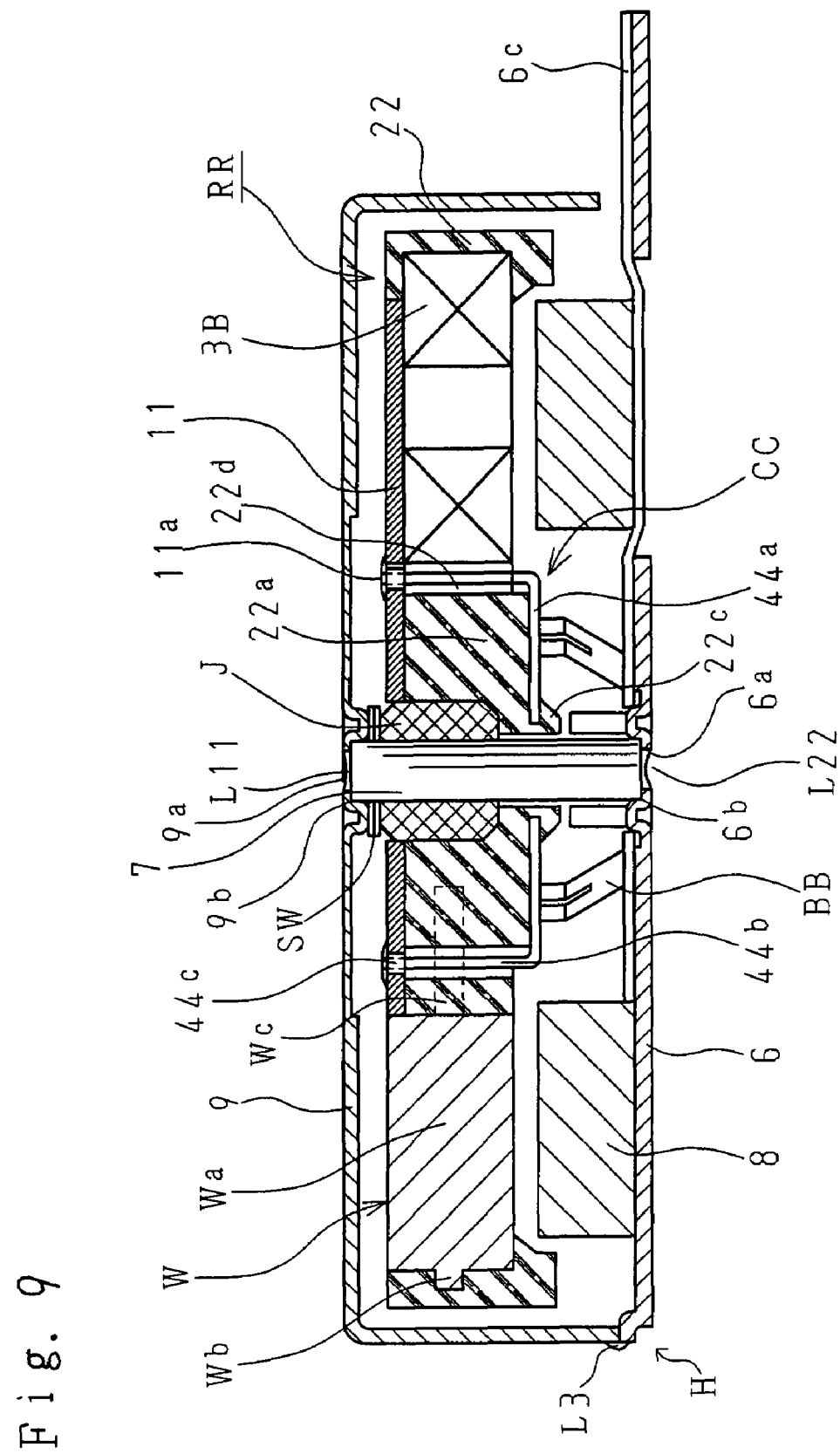
FIG. 9 is a cross-sectional view of an axial air-gap coreless motor using a flat commutator as an axial air-gap rotor of the present invention.
Figure 10:
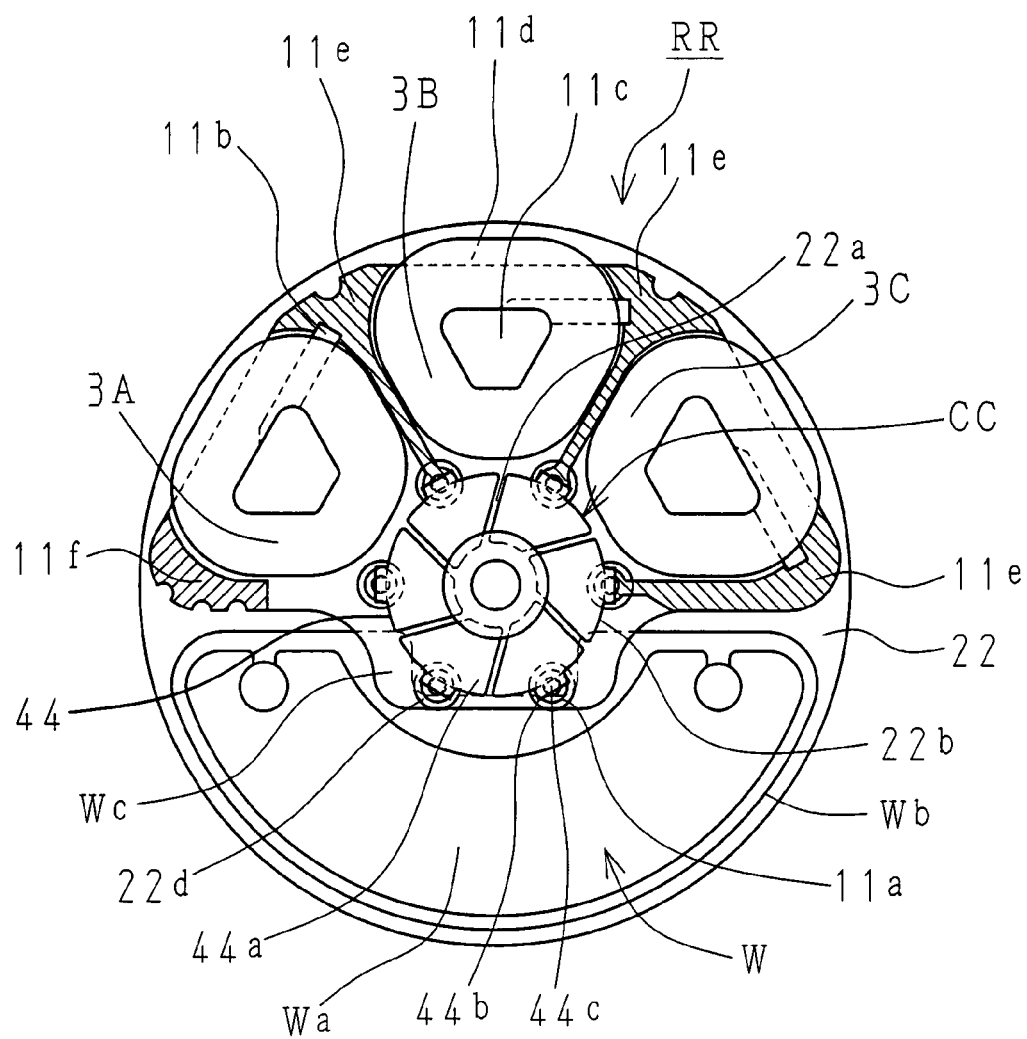
FIG. 10 is a plan view of the rotor in FIG. 9 viewed from the bottom.
Figure 11:
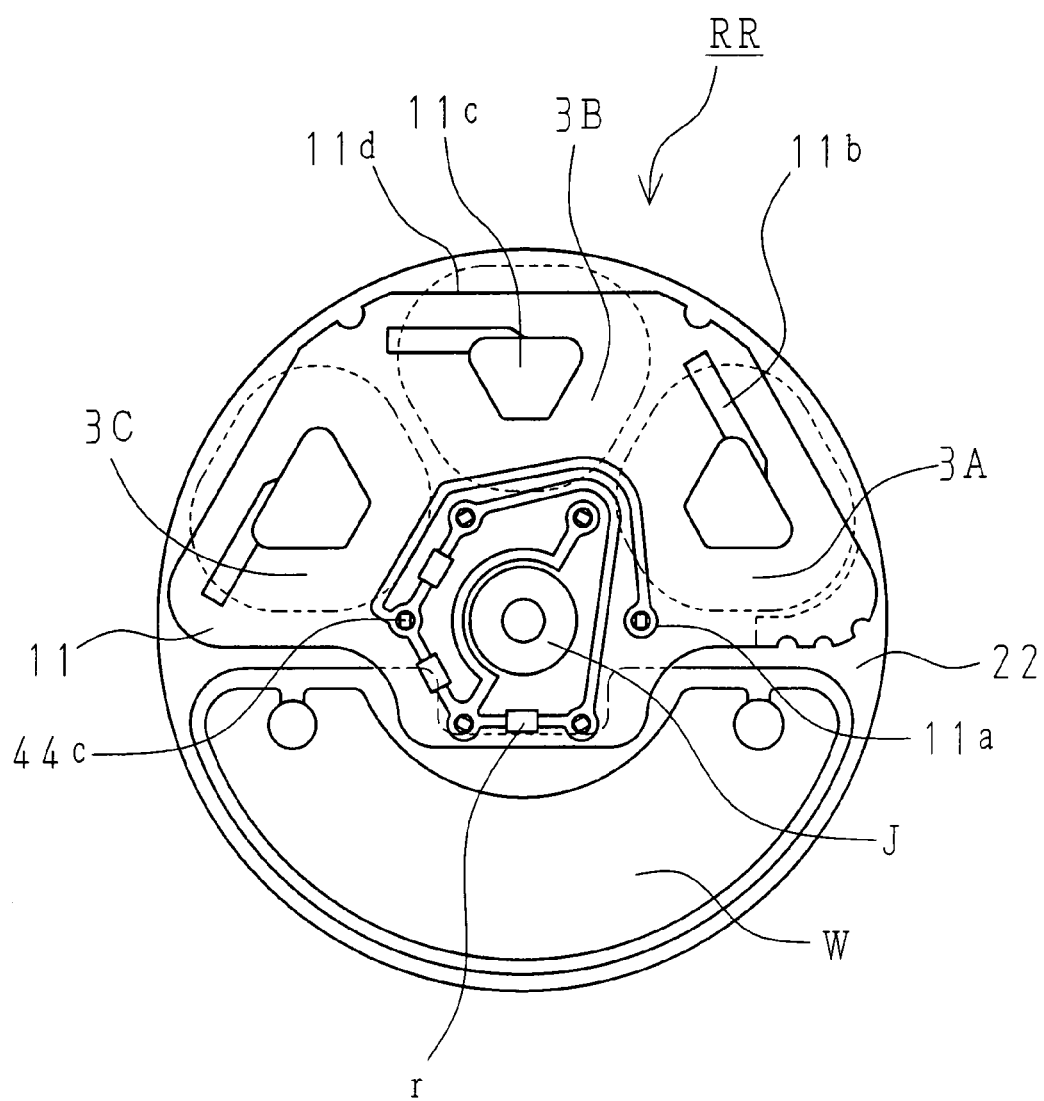
FIG. 11 is a top view of the rotor in FIG. 9.

In FIGS. 9 through 11, at the center of one side of a printed wiring board 11, a commutator base 22a constituting a flat commutator CC, and three wound air-core armature coils 3A, 3B and 3C as described above disposed radially outward of the commutator base 22a at a disposition opening angle of about 60° C. are integrally molded with an eccentric weight W provided on the opposite side therefrom across the center using a resin 22 advantageously having a thermal deformation temperature of 250° C. or higher.

The flat commutator CC comprises the base 22a and six commutator pieces 44 radially provided on the base so as to be separated from each other. Each of the commutator pieces 44 comprises a flat sliding contact portion 44 and a connection terminal 44b extending in the axial direction toward the printed wiring board 11 from, and integral with, the sliding contact portion 44a.

The sliding contact portion 44a of the commutator piece 44 has a thickness of about 0.15 mm or more, more preferably from about 0.15 mm to 0.3 mm so as to maintain sufficient rectifying properties even if there is friction, and at least the surface that is in sliding contact with the brush is cladded with noble metal to a thickness of, for example, about 0.08 mm.

For accurate placement of the commutator pieces 44 via diagonal slits (with a width of 0.15 mm here), a recess 22b the same shape as the sliding contact portions 44a formed on the base 22a is made to serve as a positioning guide. For further prevention of axial movement, the raised portion 22c at the center of the base 22a is slightly crushed and locked.

The base 22a further has holes 22d into which the connection terminals 44d are fitted, and the printed wiring board 11 at the distal end thereof has through holes 11a into which the leading ends 44c of the connection terminals 44b are fitted.

As shown in FIG. 10, at the other side of the printed wiring board 11, the distal ends 44c of the connection terminals 44b are soldered and connected in the through holes 11a. The through holes 11a are such that the connection terminals in the through holes facing each other with respect to the rotation center are shorted by a printed pattern, and spark quenching printing resistance r is connected between adjacent through holes 11a.

The through holes 11a on one side are connected by a printed pattern to the three terminal connection lands 11e formed on the outer periphery of the printed wiring board 11 in order to connect the winding start terminals of the wound air-core armature coils 3A, 3B and 3C by printing. In the drawings, 11f is a star connection land for gathering and connecting the winding end terminals of the wound air-core armature coils 3A, 3B and 3C.

The printed wiring board 11 is configured such that there are further provided inner diameter guide holes 11c for the wound air-core armature coils 3A, 3B and 3C, and long holes 11b continuous therewith and transversing the coil winding thickness, parts of the outer diameter are formed into notches for leading out terminals 11d so as to be smaller than the coil disposition outer diameter, and the coil winding end terminals are connected through the notches for leading out terminals 11d.

Therefore, the winding start terminals of the wound air-core armature coils 3A, 3B and 3C pass through the long holes 11b, and are not sandwiched between the printed wiring board 11 and coils, preventing their crushing and disconnection.

The eccentric weight W is formed of tungsten alloy having a specific gravity of about 18 to form an eccentric rotor RR, configured so that a main component Wa is exposed at the portion where there is no printed wiring board 11, and an axial retaining part Wb also serving as weight enhancement with its outer periphery embedded in the resin and radial retaining part Wc using the periphery of the holes 22d are formed.

With such a configuration, impact resistance is ensured even with the weight of the eccentric weight W, and a large eccentricity can be obtained due to the difference in the specific gravity between the wound air-core armature coils and the eccentric weight W.

The eccentric rotor RR further has at the center thereof an oil-impregnated bearing J integrally embedded therein, and is rotatably accommodated via the fixed shaft 7 in a housing H formed of the case 9 and bracket 6.

The shaft 7 is configured as a fixed-shaft type such that the distal end thereof is fitted in the recess 9b having the small diameter through hole 9a at the center of the case 9 and is fixed by laser welding L11.

The shaft 7 has rotatably attached thereto the eccentric rotor RR via a thrust washer SW and oil-impregnated bearing J, and faces, across an air-gap, a brush BB that is in sliding contact with the flat commutator CC from the axial direction, and a magnet 8 disposed in the bracket 6 outward of the brush BB.

The shaft 7 is assembled by fitting the base end thereof in the recess 6b having the small diameter through hole 6a provided at the center of the bracket 6 and laser welding L22 from outside as necessary, and the outer periphery of the bracket 6 and the open end of the case 9 are laser welded L3.

Figure 12:
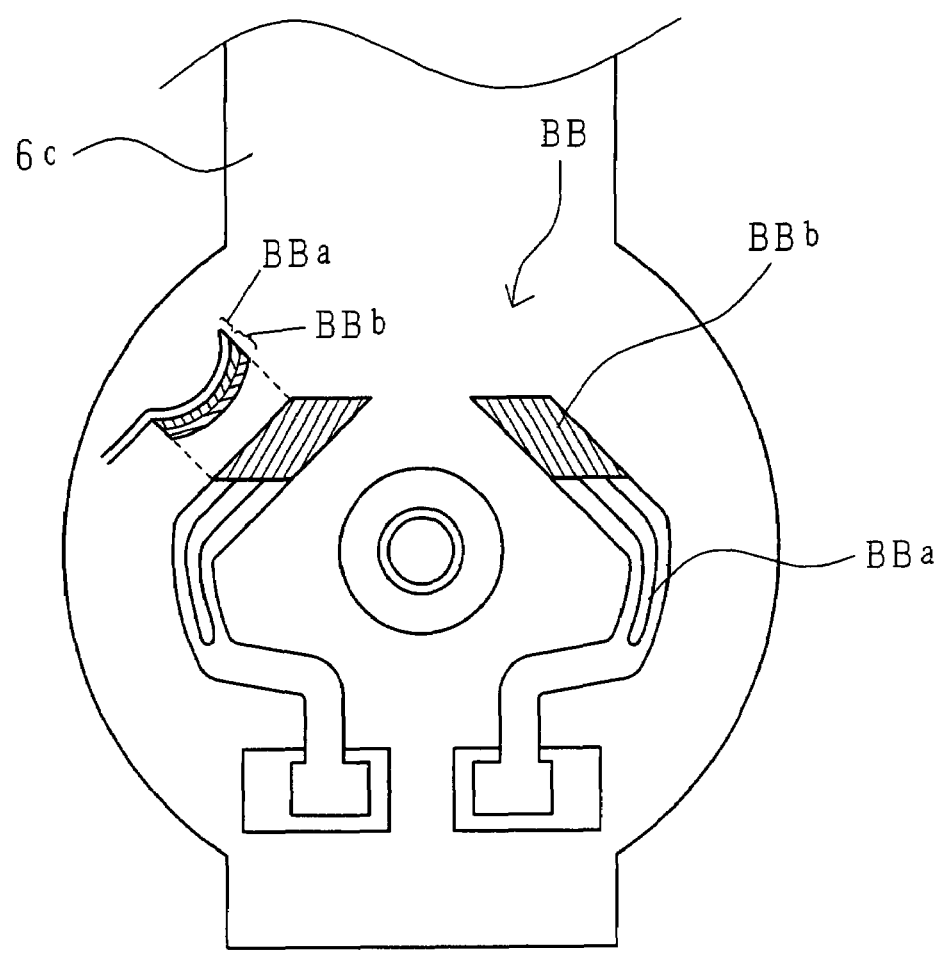
FIG. 12 is a plan view of a brush.

The brush BB is implanted so that, as shown in FIG. 12, the positive and negative sliding contact portions are brought in sliding contact with the flat commutator CC at an opening angle of 90° C., and the base end is soldered to the brush base 6c provided in the bracket 6.

Figure 13:
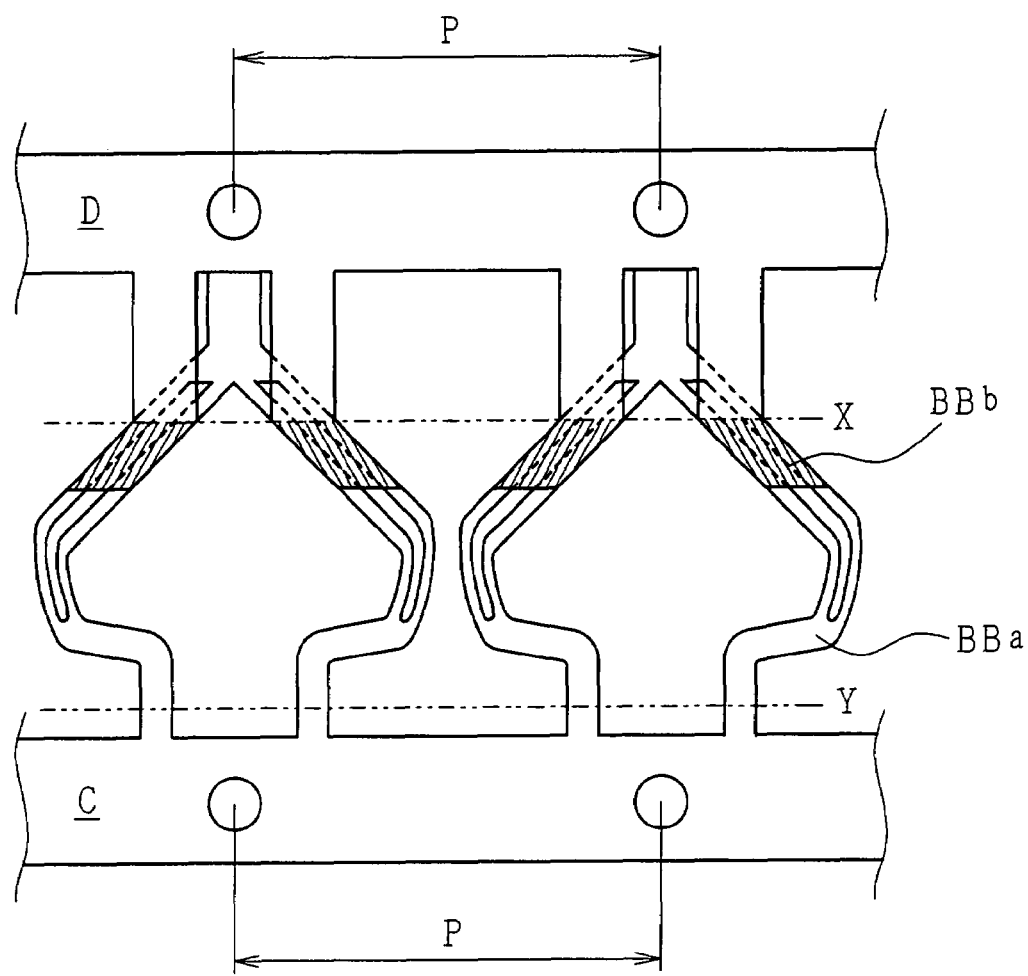
FIG. 13 is a diagram for explaining a manufacturing method for attaching the sliding piece Bb in FIG. 12 to a brush spring.

As shown in FIG. 13, a brush BB comprises a brush spring BBa formed by pressing in a coupled state a large number of springy white-metal two-pronged forks having a thickness of 0.03 mm to 0.1 mm, more preferably of about 0.05 mm, and a sliding piece BBb press formed of a hoop material with a thickness of 0.1 mm to 0.3 mm, preferably about 0.15 mm and cladded with noble metal to a thickness of about 0.08 mm on the sliding surface thereof. The brush spring and sliding pieces are matched at the same pitch P and spot welded, and the connecting sections are removed.

To form such brush sliding pieces BBb, rows C and D are brought together, to avoid noble metal cladded portion loss, and are pressed in a state in which a large number of pieces are coupled at the same pitch P, and here, on the sliding pieces BBb row D, a brush spring BBa having both ends coupled and formed at the same pitch P is overlapped and spot welded thereto. After forming the sliding contact surface into a given arc shape, the brush spring BBb and sliding piece BBb are integrally separated along the line X, and the brush spring is separated along the line Y.

The commutator sliding contact surface of the sliding portion BBb has a slightly tilted wave form, that is, it is formed to have undulations, so as to obtain good sliding contact.

With this slanted contact, contact stability is ensured and friction at time of sliding is reduced. Therefore, for ease of processing, one wide sliding piece can be used instead of two.

Figure 14:
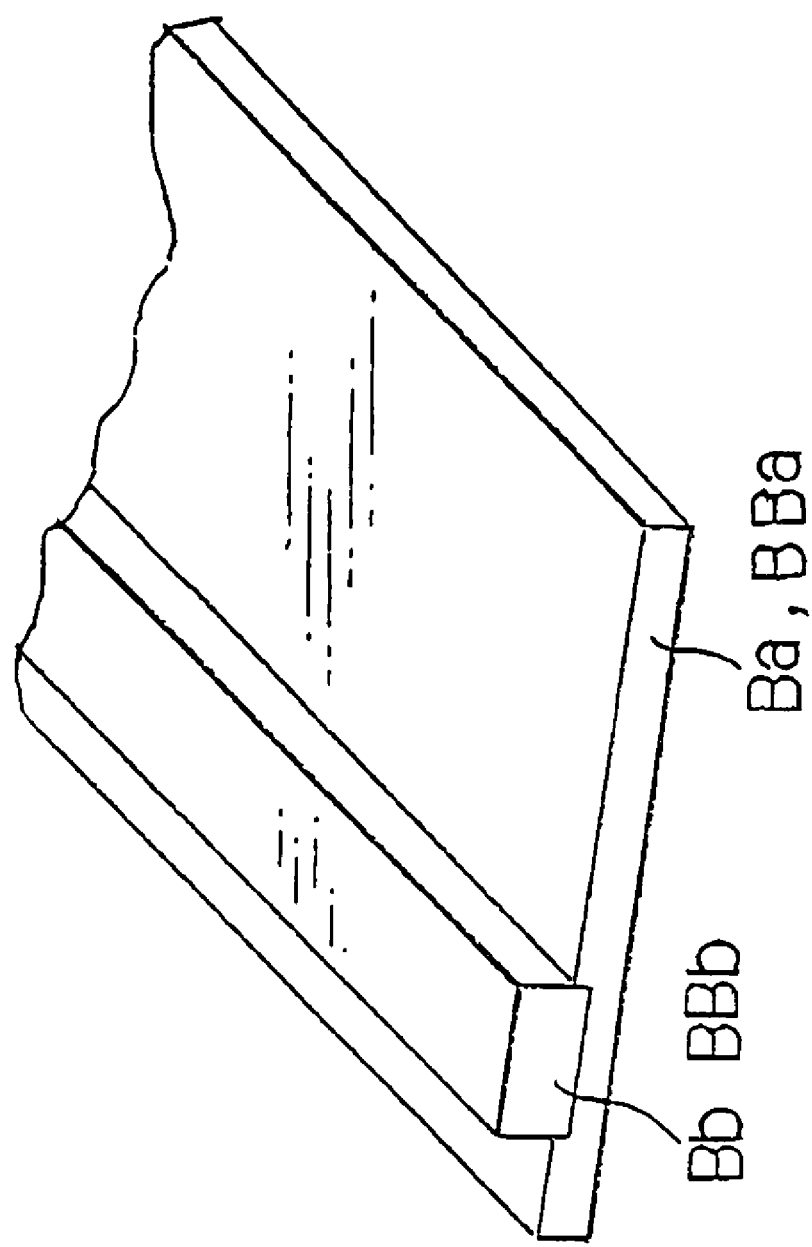
FIG. 14 is a perspective view of a brush according to another embodiment.

As shown in FIG. 14, the brushes may comprise brush springs Ba, BBa cladded with sliding contact members Bb, BBb formed of noble metal alloy with a thickness of about 0.05 mm to 0.1 mm. The brush materials thus configured are punched by pressing, thereby forming brushes B, BB. With such a configuration, the brush springs serve as base material for the sliding contact members.

For the above embodiments, explanations were given for an axial air-gap rotor configured as a vibration motor. Because an output shaft does not protrude from the motor, the motor of a fixed-shaft type can be used for a standard rotation type geared motor as described, for example, in Japanese Patent No. 3398546.

Further, the explanations were given for a rotor containing a sintered oil-impregnated bearing. Alternatively, a resin bearing in which a resin itself has a sliding property can be used.

The present invention can be implemented in a variety of ways, without departing from this technical concept and features inherent thereto. Therefore, the above-described embodiments are merely illustrative examples and should not be construed as limiting. The technical scope of the present invention is described by the claims and is not restricted to the text of the description.

What is claimed is:

1. An axial air-gap rotor comprising,
  a printed wiring board;
  wound air-core armature coils disposed on one side of the printed wiring board, the printed wiring board including terminal connection lands for the wound air-core armature coils formed thereon, and a plurality of through holes connected to a portion of the terminal connection lands; and
  a commutator disposed at the rotation center of said one side of the printed wiring board, the commutator including a base and commutator pieces, said commutator pieces including sliding contact portions separated from each other by positioning guides provided on the base, and contact terminals integral with and extending axially from the sliding contact portions, the commutator pieces being placed on the base, and the distal ends of the connection terminals being fitted in the through holes and connected to said portion of said terminal connection lands.

2. An axial air-gap rotor according to claim 1, wherein: the printed wiring board includes notches for leading out terminals for the wound air-core armature coils; and the wound air-core armature coil terminals are led out through the notches for leading out terminals.

3. An axial air-gap rotor according to claim 1, wherein the commutator has a cylindrical shape, the sliding contact portions of the commutator pieces are formed in an arc shape, between the sliding contact portions and the connection terminals there is provided a flat portion that is at least in part no thicker than the wound armature coils, and the flat portion is used for positioning guides.

4. An axial air-gap rotor according to claim 3, wherein a thin magnetic body is formed on an other side of the printed wiring board.

5. An axial air-gap rotor according to claim 1, wherein;
the commutator is of a flat type;
the sliding portions of the commutator pieces have a planar shape; and
at least the sliding contact portions are used as the positioning guides.

6. An axial air-gap rotor according to claim 1, wherein the wound air-core armature coils and an eccentric weight are integrated with the base using a resin.

7. An axial air-gap rotor according to claim 6, wherein the eccentric weight comprises a main component and retaining parts interlocked with the resin.

8. An axial air-gap coreless motor using the axial air-gap rotor according to any one of claims 1 through 7, wherein the axial air-gap rotor has a shaft support portion in the center, the axial air-gap rotor is rotatably supported in the housing via the shaft, and there are provided a brush in sliding contact with the commutator pieces, a magnet provided outward of the brush, and the housing for accommodating the same.

9. An axial air-gap coreless motor according to claim 8, wherein the commutator pieces have a thickness of at least 0.15 mm and at least the sliding surface thereof is cladded with noble metal, the brush comprises a spring material with a thickness of 0.03 mm to 0.08 mm and a sliding contact member having a sliding contact portion cladded with noble metal with a thickness of at least 0.05 mm disposed on the spring material.

* * * * *